United States Patent [19]

Stephenson

[11] 4,001,557
[45] Jan. 4, 1977

[54] STORED PROGRAM DIGITAL PROCESS CONTROLLER

[75] Inventor: Dwight L. Stephenson, Los Alamos, N. Mex.

[73] Assignee: The United States of America as represented by the United States Energy Research and Development Administration, Washington, D.C.

[22] Filed: Oct. 14, 1975

[21] Appl. No.: 621,894

[52] U.S. Cl. .......................... 235/151.1; 235/152; 236/46 R; 236/15 R; 432/51
[51] Int. Cl.² ................ G05B 19/02; G05D 23/00; G06F 15/46
[58] Field of Search ............. 235/151.1, 151, 152, 235/156, 150.53; 340/172.5; 236/46 R, 46 A, 15 R, 15 B; 425/143; 264/40; 266/5 T; 432/51

[56] References Cited

UNITED STATES PATENTS

| | | |
|---|---|---|
| 3,428,250 | 2/1969 | Holthausen ..................... 236/46 A |
| 3,761,882 | 9/1973 | Bartlett et al. ................. 340/172.5 |
| 3,819,915 | 6/1974 | Smith ......................... 235/151.1 X |
| 3,829,842 | 8/1974 | Langdon et al. ........... 235/151.1 X |
| 3,912,913 | 10/1975 | Bunting ....................... 236/46 R X |
| 3,922,535 | 11/1975 | Randolph ...................... 236/46 R |

Primary Examiner—Joseph F. Ruggiero
Attorney, Agent, or Firm—Dean E. Carlson; Jerome B. Rockwood

[57] ABSTRACT

A digital process control function generator wherein a timing clock, in conjunction with programmable read only memories controls variables in a process with respect to time.

1 Claim, 4 Drawing Figures

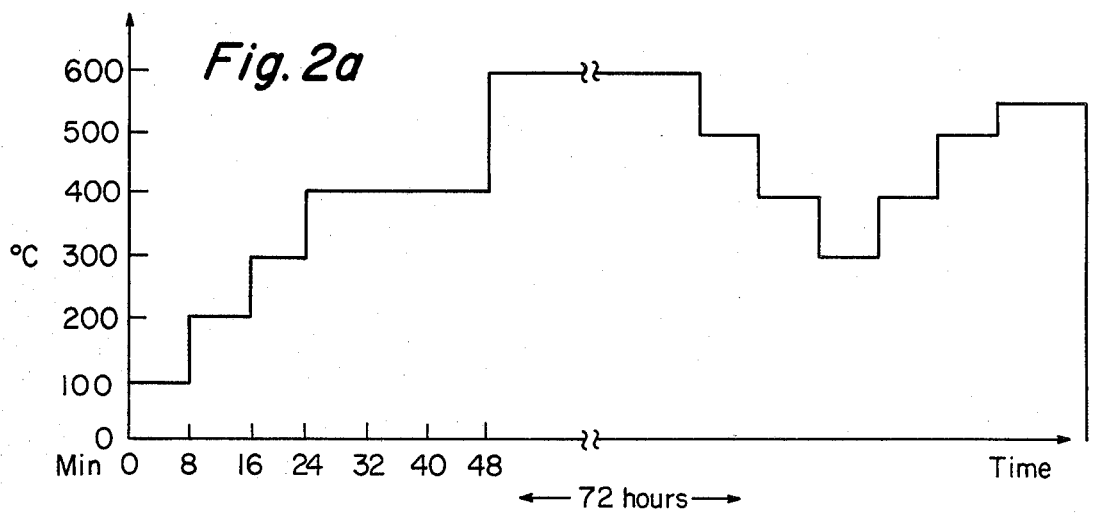
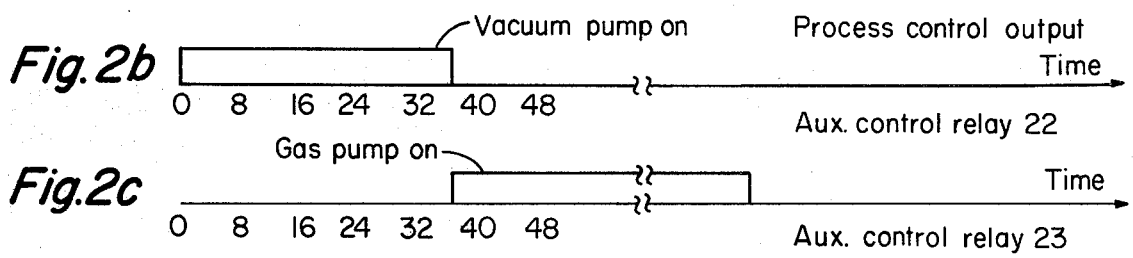
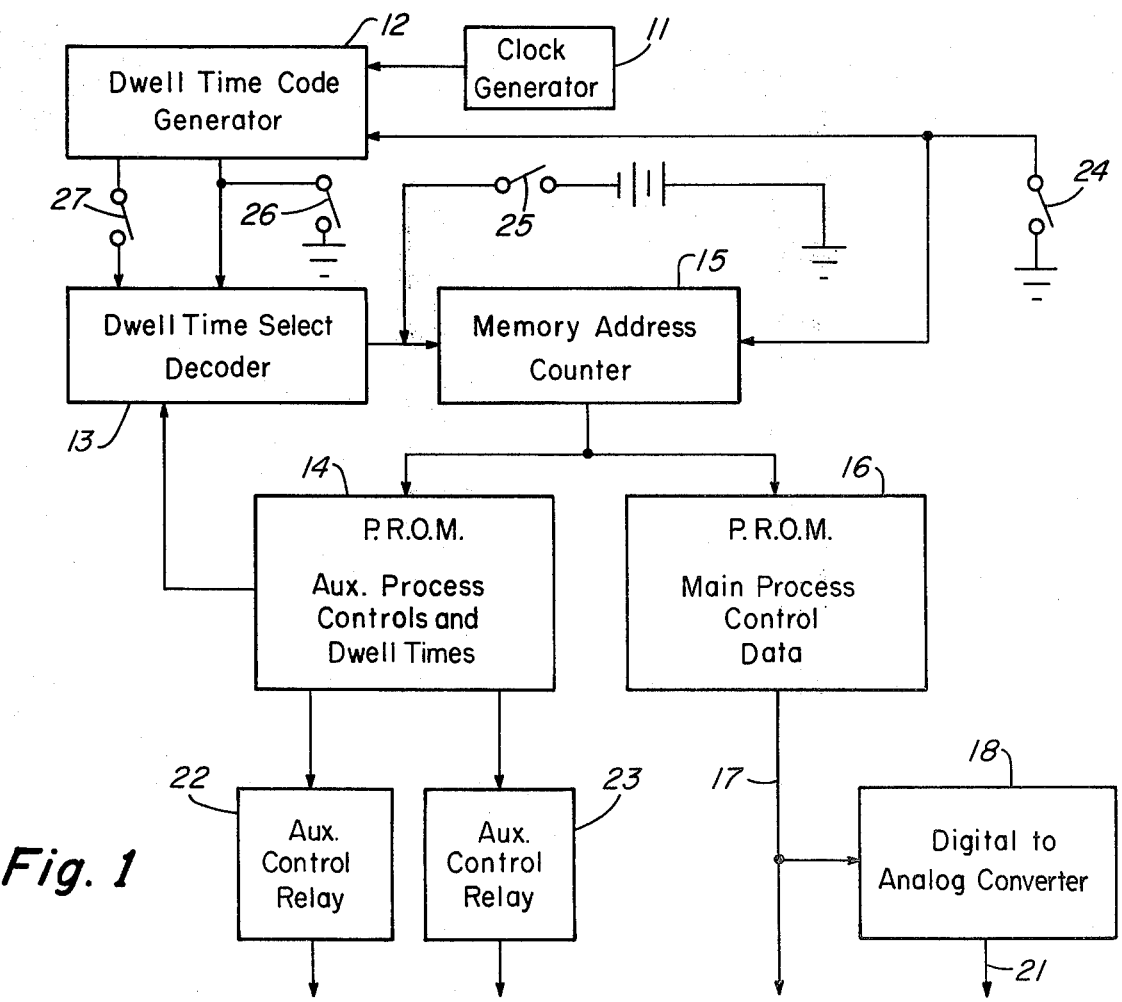

STORED PROGRAM DIGITAL PROCESS CONTROLLER

BACKGROUND OF THE INVENTION

The present invention relates to a digital process controller and more particularly to a digital process controller for controlling long period industrial processes. Industrial process controllers heretofore known to the art which are capable of controlling industrial processes requiring several hours or days, have frequently been electro-mechanical, such as clock operated switches or paper or magnetic tape readers. Such electro-mechanical devices, when employed in an industrial environment, have been extremely bulky and cumbersome. Further, reliability in an industrial environment of such electro-mechanical devices has been difficult to achieve. As a result, many processes, such as heat treatment and annealing of metals, has been controlled manually. Since manual control is subject to human error, there has long been a demand for a simple, reliable, inexpensive automatic process controller suitable for use in connection with industrial processes which may require a period of up to several days for completion.

SUMMARY OF THE INVENTION

In the present invention, any arbitrary function may be stored in a programmable read only memory (PROM), and read out at any predetermined rate. A suitable stable frequency source is applied to a frequency divider. A programmable read only memory selects the desired time periods, enabling pulses at selected times to be applied to select the desired function to be performed at that particular time from a second programmable read only memory. The signal from the second programmable read only memory may then be applied digitally to actuate the desired function at the desired time. Alternatively, the digital-analog converter may be employed to convert the digital function signal from the second programmable read only memory to a voltage level signal suitable for controlling analog process controls. In addition, on-off control signals may be applied to control auxiliary processes.

BRIEF DESCRIPTION OF THE DRAWINGS

FIG. 1 is a block diagram of a digital process controller constructed in accordance with the present invention;

FIG. 2a illustrates the present invention as applied to a typical industrial process, i.e., heat treatment; and, FIGS. 2b and 2c illustrate auxiliary controls as applied to the heat treatment process of FIG. 2a.

DESCRIPTION OF THE PREFERRED EMBODIMENT

Referring now to FIG. 1, a suitable stable frequency voltage from a clock generator 11 is applied to dwell time code generator 12. Clock generator 11 may be a crystal controlled oscillator, or if less timing accuracy is acceptable, may be the 60 Hz line frequency. Dwell time code generator 12 is a conventional counter type frequency divider circuit. Essentially, dwell time code generator 12 comprises a scale-of-two counter making available a plurality of output pulses at sub-harmonics of the stable frequency signal applied on line 11. Assuming the 60 Hz line frequency is applied, output pulses are available at 1/30 s, 1/15 s, etc. up to a period of many hours or even days. Conveniently, division by 6, 5, and 2 may be employed whereby 10 p/s, 5 p/s, 1 p/s, 1 p/2 s, 1 p/10 s, 6 p/min, 1 p/min, 30 p/h, 1 p/4 min, and 1 p/8 min, are generated. These pulses are applied to dwell time select decoder 13. Programmable read only memory 14 is also connected to dwell time select decoder 13. Dwell time select decoder 13 comprises a plurality of "and" gates connected to the pulse outputs from dwell time code generator 12. The desired process times are stored in programmable read only memory 14. The desired program times are then applied to dwell time select decoder 13. Dwell time select decoder 13 comprises a plurality of gates connected to the time pulse outputs from dwell time code generator 12. Dwell times are automatically selected by the control bit pattern stored in the programmable read only memory 14. Desired dwell times are determined by the process requirements at each program step, and are pre-programmed into the programmable read only memory 14. Pulses at the selected times are delivered by dwell time select decoder 13 to memory address counter 15. Memory address counter 15 is a conventional binary counter. The counter 15 is connected to programmable read only memory 14 and to programmable read only memory 16. Thus each time pulse provided by dwell time select decoder 13 to memory address counter 15 selects a particular address to programmable read only memory 16. The data stored in the selected address are connected to the process controller either directly over line 17 through a digital-to-analog converter 18 and to the process equipment over line 21.

The programmable read only memories 14 and 16 provide a semi-permanent storage for the desired primary process variable data, auxiliary process data, and dwell time control. The programmable read only memories presently employed in connection with the invention provide 256 address locations each containing eight bits of information. Programmable read only memories are erasable and therefore program modification is simple and inexpensive. Auxiliary outputs are provided through the auxiliary control relays 22 and 23. These may be employed to control simple on-off portions of the process. The auxiliary control outputs are independent of the primary process control variable, and may be programmed to achieve the desired auxiliary process control versus time profiles. Auxiliary outputs are provided through the auxiliary control relays 22 and 23. These may be employed to control simply on-off portions of the process. The auxiliary control outputs are independent of the primary process control variable, and may be programmed to achieve the desired auxiliary process control versus time profiles.

Additional controls are provided to enable more versatile control of the process. A manual reset switch 24 is provided to enable resetting of memory address counter 15 and dwell time code generator 12 to zero if circumstances require the process operation to be aborted. A manual advance switch 25, connected to the input of memory address counter 15 enables the manual control of the timing of process steps. In addition, a hold switch 26 grounds the output of the dwell time code generator 12, preventing advance of the process beyond the point in time when the hold switch 26 is actuated. A fast advance switch 27 is also provided. Fast advance switch 27 connects dwell time select decoder 13 to the 30 Hz output from dwell time code generator 12, enabling a rapid advance through steps of the process when such action is required.

A typical process suitable for control by the process controller of the present invention is illustrated in FIGS. 2a, 2b, and 2c. Referring to FIG. 2a, upon actuation of the controller of the present invention, a pulse is applied by clock generator 11 through the dwell time code generator 12 to the dwell time select decoder 13. This pulse is also applied to memory address counter 15. The memory address counter selects the address in programmable read only memory 16, which is programmed to step the process control furnace to 100° C. Simultaneously memory address counter 15 also addresses the pulse to programmable read only memory 14. Programmable read only memory 14, at the first address, is coded to require a dwell time of 8 min at 100° C. This dwell time is applied to dwell time select decoder 13, wherein another pulse from dwell time code generator 12 is not permitted until the selected dwell time of 8 min. has elapsed.

In a similar manner after 8 min another pulse is applied to memory address counter 15 and to programmable read only memories 14 and 16. This pulse selects the required temperature stored in programmable read only memory 16, of 200° C and the required dwell time, stored in programmable read only memory 14, of 8 min. In the next step, as illustrated in FIG. 2a, the temperature is increased to 300° C for another 8 min, and to 400° C for 24 min. At the next step in the program, the furnace temperature is increased to 600° C and held there for a period of 72 hours. Temperatures are then reduced in 100° C steps each 8 min to a temperature of 300° C, then increased again in steps of 100° C for 8 min back to 550° C. After 12 min at 550° C the furnace is shut off.

Simultaneously with the initial step applied to the furnace, auxiliary control relay 22 is actuated to turn on a vacuum pump which gasses out the furnace. The vacuum pump is held on for a period of 36 min, when auxiliary control relay 22 is shut off and auxiliary control relay 23 is simultaneously turned on. Auxiliary control relay 23 serves to actuate a gas pump, which fills the furnace with a suitable gas at a preset pressure. Gas pressure is maintained in the furnace until the temperature is required to be dropped after the 72 hour period, illustrated in FIG. 2a.

As will be apparent the furnace may be operated digitally over line 17 or in response to an analog signal over line 21. The controls on the furnace determine the type of output signal used.

What I claim is:

1. Digital process controlling apparatus comprising:
a clock generator;
a dwell time code generator connected to said clock generator for providing a plurality of pulse frequencies;
dwell time select decoder connected to said dwell time code generator selecting desired pulse frequencies;
memory address counter means in circuit with said dwell time select decoder for converting said pulse frequencies to memory addresses;
a first programmable read only memory having an input from said memory address counter and an output to said dwell time select decoder for setting dwell times corresponding to memory addresses;
a second programmable read only memory having an input from said memory address counter having process variables stored therein at addresses coinciding with the corresponding dwell times stored in said first programmable read only memory;
process control means connected to the output of said second programmable read only memory; and,
an auxiliary process control relay connected to the output of said first programmable read only memory.

* * * * *